L. L. SUMMERS.
PROCESS FOR VENTILATING AND COOLING.
APPLICATION FILED OCT. 20, 1913.
1,310,511. Patented July 22, 1919.
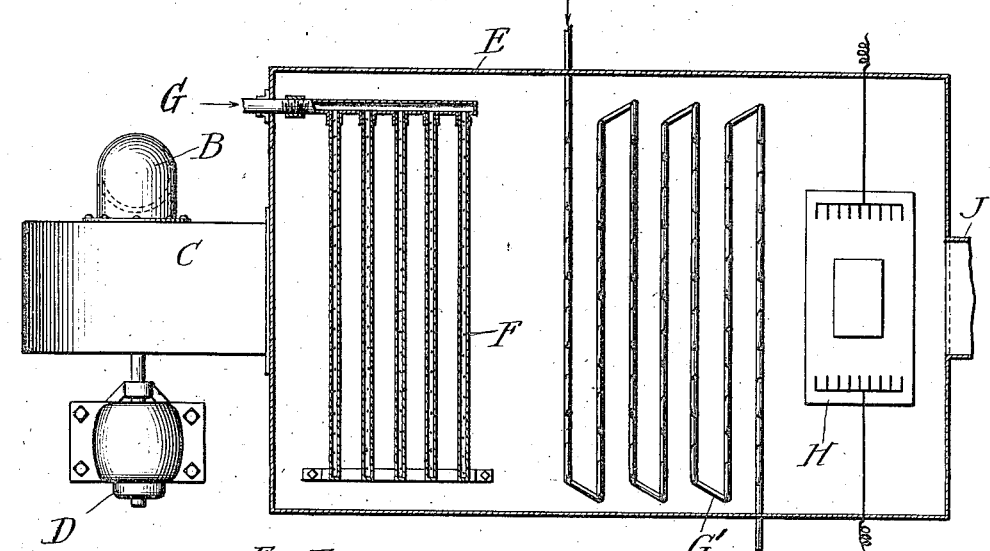
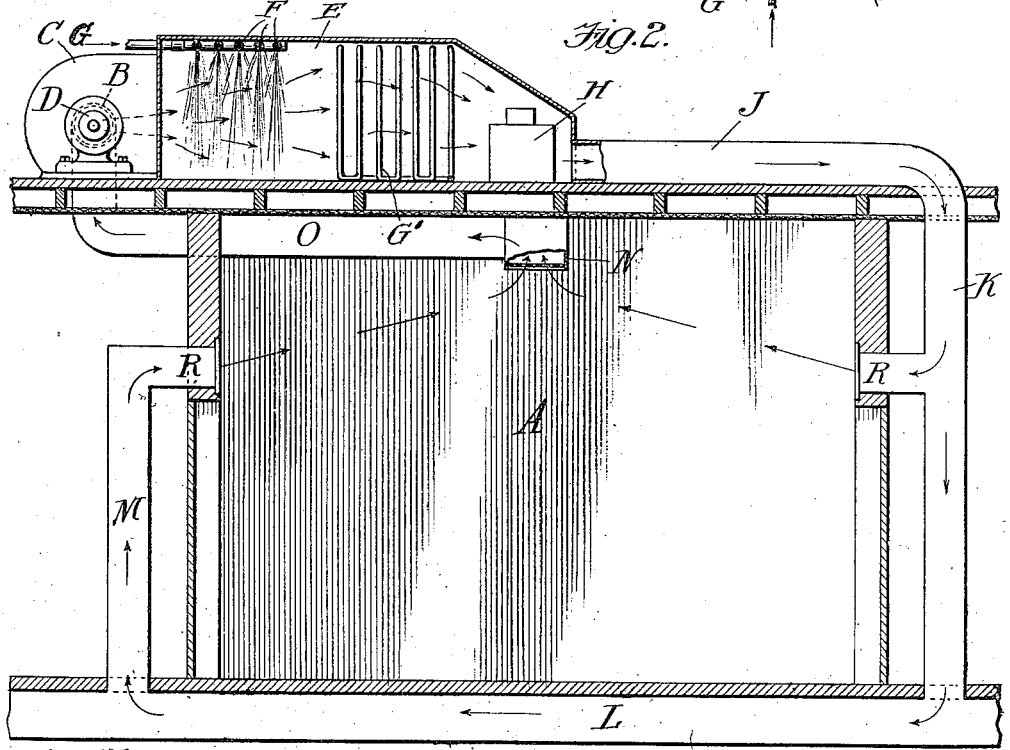

UNITED STATES PATENT OFFICE.

LELAND L. SUMMERS, OF CHICAGO, ILLINOIS.

PROCESS FOR VENTILATING AND COOLING.

1,310,511.   Specification of Letters Patent.   Patented July 22, 1919.

Application filed October 20, 1913. Serial No. 796,257.

*To all whom it may concern:*

Be it known that I, LELAND L. SUMMERS, a citizen of the United States, residing at Chicago, in the county of Cook and State of Illinois, have invented a new and useful Improvement in Processes for Ventilating and Cooling, of which the following is a specification.

My invention relates more particularly to the preparation, purification, cooling and circulation of air in connection with dwellings, hospitals, public halls, offices, warehouses, and the like, where it is desirable to maintain a degree of humidity lower than that of the external atmospheric air and in many cases a temperature that is also lower than that of the external atmosphere for the personal comfort and efficiency of the occupants. Processes of cooling air have heretofore been used principally in warehouses and the like for maintaining a low temperature for the preservation of food products and for similar purposes. In the relatively rare cases in which rooms or apartments have been refrigerated or cooled for the personal comfort of the occupants thereof, the cooled air has simply been passed or forced into the chamber or chambers to be cooled and permitted to escape therefrom, its use being accompanied with such losses as to make its general use impracticable.

In the process which forms the subject matter of the present invention the air is cooled and its humidity lowered to a suitable degree prior to being fed into the chamber or room in which it is to be used. It is not permitted, however, to be wasted as heretofore, thus requiring the entire work to be done over again on a new body of atmospheric air to be introduced into the chamber but it is so circulated that its humidity is not permitted to reach the normal humidity of the atmosphere and is returned to the purifying and cooling apparatus where it is again treated prior to its re-introduction into the chamber or room in which it is again used. By re-using the air which has once been treated and dried rather than taking in a new supply of air from the outside atmosphere a great saving of work and much higher efficiency results. For in cooling the air where it contains a considerable amount of moisture as is the case with atmospheric air a great loss occurs by reason of the fact that the moisture condenses giving up its latent heat of vaporization to the air and so tending to maintain the temperature of the latter. By treating the air which has already been dried, even though its humidity has been somewhat increased in the meantime by admixture or otherwise, the bulk of the loss due to condensation is avoided.

With this general statement of the nature and objects of my invention I will proceed to a detailed description thereof in connection with the drawings, which form a part of this specification, but it is to be understood that the detailed disclosure is for the purpose of exemplification only, the scope of the invention being set forth in the following claims in which I have endeavored to distinguish it from the prior art so far as known to me without, however, relinquishing or abandoning any portion thereof.

In the accompanying drawings I have illustrated the invention diagrammatically, Figure 1 being a plan view partly in section of the air treating apparatus, and Fig. 2 a vertical section through a room and the apparatus shown in Fig. 1 operatively connected thereto, the latter being shown upon a somewhat reduced scale as compared to Fig. 1.

The apparatus generally speaking comprises cooling and purifying devices, a fan and conduits connecting the same to the room, the atmosphere of which is to be treated, whereby the air may be withdrawn from the room, suitably treated and again returned to the room. The latter is indicated at A in Fig. 2 and has an outlet or outlets N located in the upper part thereof and connected by a conduit O with the intake B of a fan or other suitable air forcing device C which is driven by a motor D of any suitable type. From the fan the air is discharged directly into the chamber E containing in succession and in the order named a spraying device, a cooling system and an ozonizing device. Obviously, if desired, these various instrumentalities could be arranged in separate but communicating chambers. The spraying device consists of a series F of perforated pipes to which water is supplied by an inlet G, the chamber E being also provided with a suitable drain outlet (not shown) for the water. If desired untreated water may be used for the purpose of purification but purifying chemicals may be added thereto if desired such as hypochlorites or other disinfectants for removing germs and odors and lime for the purpose of absorbing the carbonic acid.

After being thoroughly sprayed the air next passes to cooling coils G' of any desired form and within which ammonia or cooling brine is circulated. The air passing through and around these coils has its temperature reduced to such a degree that a large part of the moisture contained therein is precipitated and the air thus dried. The degree of refrigeration of the air will depend upon a number of factors among which may be mentioned the degree of humidity which it is desired to maintain in the chamber, the atmosphere of which is to be affected, and the degree of humidity and the proportion of the more humid air with which the dry air is to be mixed. From the refrigerating coils the air next passes to an ozonizing chamber H represented diagrammatically, but which may contain any approved or desired ozone producing device but which are preferably of that type producing the silent electrical discharge. As is well known the effect of passing air through apparatus of this character is to convert a portion of the gases thereof into ozone and the oxids of nitrogen which have more tonic properties than ordinary air. From the ozonizer the purified, cooled, dried and ozonized air passes through a conduit J, a down-comer K, a cross pipe L and a riser M to inlets R located in the walls of the chamber A at a height approximately one-half or two-thirds that of the chamber.

The air is thus circulated continuously through the room or chamber and returned through the purifying, drying and cooling apparatus, there being ordinarily no provision for the admission of outside air to the chamber A other than the ordinary doors or windows. In ordinary practice even the latter are maintained normally closed. Thus the work done upon the air in cooling and drying it is not wasted by permitting it after once passing into the chamber to escape therefrom by the outlets of the room but it is returned to the purifying and cooling apparatus and after having been refreshed is returned to the chamber. By locating the inlets in the upper parts of the side walls and the exhaust still higher, I provide a zone of treated air in the upper part of the room, for the upward suction caused by the fan to a large extent counteracts the tendency of the cool dry air upon entering the room to drop to the floor and displace the warmer more humid air contained in the chamber. There is, however, a continuous admixture of the more humid air from the room with the cooler and drier air passing through the upper part thereof which is sufficient to maintain a proper condition of atmosphere in the entire room, but the admixture may be so proportioned and the humidity thereof kept so low by the location of the inlet and outlet openings and the action of the fan as to require only a comparatively small purifying and cooling apparatus to take care of the same, since, as before stated, the less the degree of humidity of the air passing through the cooling coil the less work which need be done upon it to restore it to the proper temperature and degree of humidity. It is of course always possible, if desired, and in the event of a higher outside temperature to raise the temperature and humidity in the room by opening the doors or windows thereof.

I claim:

1. A process for ventilating consisting in continuously circulating air through the upper part of the room to be ventilated and through means for treating the air and returning it to said room and maintaining a region of substantial quiescence in the lower portion of the room.

2. A process for ventilating consisting in confining a body of quiescent air in the lower part of the room to be ventilated, supplying drier air to the upper part thereof, permitting a limited quantity of the confined air to mix with the supplied air, withdrawing said mixture, reducing its moisture and returning it to said room.

3. A process of ventilation consisting in injecting into the upper portion of the space to be ventilated a portion of cooled dry air having a specific gravity causing it to tend to descend and checking this descent by causing an upward movement of air and recirculating the cooled and dry air.

4. A process of ventilation consisting in maintaining a zone of quiescent air in the compartment withdrawing a portion of the air from the room to be ventilated, washing the air with a chemical to absorb impurities and destroy bacteria, forming ozone therein and returning the air to the room to be ventilated.

5. In a process of ventilation maintaining a zone of quiescent air in the lower portion of the compartment affected, withdrawing air from the upper portion of said compartment, cooling said air, returning the cooled air to the upper portion of the compartment and controlling the admixture with the other air of the compartment by means of the difference in specific gravities.

6. In a process of ventilation maintaining a zone of quiescent air in the lower portion of the compartment affected, withdrawing air continuously from the upper portion of said compartment, cooling said air and returning it to the upper portion of said compartment.

LELAND L. SUMMERS.

Witnesses:
JOHN B. MACAULEY,
ROBERT DOBBERMAN.